United States Patent [19]

Shimogo et al.

[11] Patent Number: 4,783,366
[45] Date of Patent: Nov. 8, 1988

[54] SHOCK ABSORBING MATERIAL

[75] Inventors: Kenzo Shimogo; Osamu Kito, both of Toyota; Atsunobu Fujikawa, Okazaki; Osamu Sanu; Haruhisa Susuki, both of Toyota; Hiroshi Torii, Hekinan; Harugi Shibata, Okazaki, all of Japan

[73] Assignees: Aisin Kako Kabushiki Kaisha; Toyota Jidosha Kabushiki Kaisha, both of Toyota, Japan

[21] Appl. No.: 882,940

[22] PCT Filed: Oct. 29, 1985

[86] PCT No.: PCT/JP85/00598
§ 371 Date: Jun. 27, 1986
§ 102(e) Date: Jun. 27, 1986

[87] PCT Pub. No.: WO86/02657
PCT Pub. Date: May 9, 1986

[30] Foreign Application Priority Data

Oct. 30, 1984 [JP] Japan .................. 59-164521

[51] Int. Cl.$^4$ .............. B32B 3/36; C08L 21/00; B05D 1/02
[52] U.S. Cl. .................. 428/315.5; 428/327; 428/465; 428/463; 428/467; 428/484; 428/492; 428/497; 524/271; 427/422
[58] Field of Search .......... 428/327, 484, 463, 497, 428/465, 492, 467, 315.9, 315.5; 524/271

[56] References Cited

U.S. PATENT DOCUMENTS 4,294,732 10/1981 Ohyachi et al. ............ 524/271
4,361,607 11/1982 Davis et al. ............... 428/492 X

FOREIGN PATENT DOCUMENTS 1152449A 7/1986 Japan .................. 428/492

Primary Examiner—P. C. Ives
Attorney, Agent, or Firm—Oblon, Fisher, Spivak, McClelland & Maier

[57] ABSTRACT

This invention concerns a shock absorbing material placed between two objects for buffering the shocks, and a method of applying the same.

Heretofore, a previously formed shock absorbing material is bonded by way of an adhesive or the like to an object to be buffered. However, there has been a disadvantage that no desired bonding strength can be obtained or the adhesive is degraded. It is intended in this invention to render the shock absorbing material fusible under heating, by which the shock absorbing material is fused due to the melting of the shock absorbing material itself with an object to be buffered using no adhesive thereby increasing the bonding area and improving the bonding strength as compared with the conventional case. This object can be attained by constituting the shock absorbing material with from 10 to 60 parts by weight of a polymeric viscous material, from 10 to 50 parts by weight of a softening agent, from 10 to 60 parts by weight of a tackifier and from 0 to 65 parts by weight of elastomeric particles. Further, by the use of the shock absorbing material of the composition, since the shock absorbing material is liquefied under heating and can be handled as a fluid, the material can directly be coated and, simultaneously, applied to an object to be buffered by using a nozzle or the like.

7 Claims, 2 Drawing Sheets

SHOCK ABSORBING MATERIAL

TECHNICAL FIELD

This invention concerns a shock absorbing material placed between two objects such as a fuel tank and a vehicle body and, more specifically, it relates to a shock absorbing material that can be applied without using an adhesive or bond, and a method of applying the same.

BACKGROUND ART

In a fuel tank for use in vehicles, for instance, a shock absorbing material 6 made of a vulcanized rubber shaping rpoduct, a mat-like non-woven fabric or the like has conventionally been appended at a portion of the surface of a fuel tank 4 by using an adhesive 5 or the like as shown in FIG. 2. Then, the fuel tank 4 is mounted, for example, to the floor back face 7 of a vehicle body by way of the shock absorbing material 6 being clamped by a metal belt or the like not illustrated.

In conventional shock absorbing materials, if the surface smoothness of an object to be buffered is poor, the area of contact with the shock absorbing material is decreased which tends to diminish the bonding strength. Further, the bonding strength of the adhesive may possibly be degraded with the passage of time, which may lead to the disadvantage that the shock absorbing material will become detached, coupled with the loosening of the metal belt due to the vibrations during running. Further, when using highly water absorbing materials such as non-woven fabrics for the shock absorbing material, water contained therein has been found to cause undesirable effects on the corrosion resistance of the vehicle body and the fuel tank.

The present invention has been achieved in view of the foregoing problems and it is an object thereof to provide a shock absorbing material which is capable of closely contacting two objects to be buffered and which is also excellent in various performances such as aging-resistant bondability, as well as to provide a method of effectively applying such a shock absorbing material.

DISCLOSURE OF THE INVENTION

The feature of the shock absorbing material according to this invention resides in a shock absorbing material which is placed between two objects, for example, between the surface of a vehicle body and the surface of a fuel tank for buffering the impact shocks resulting from vibrations or the like, wherein the shock absorbing material comprises from 10 to 60 parts by weight of a polymeric viscous material, from 10 to 50 parts by weight of a softening agent, from 10 to 60 parts by weight of a tackifier and from 0 to 65 parts by weight of elastomeric particles, and the shock absorbing material is a fused member joined to at least one surface of the two objects.

While the shock absorbing material according to this invention can be appended by way of an adhesive or bond as usual, it is preferred to increase the adhesiveness of the shock absorbing material by heating and to fuse the shock absorbing material directly at least to one and, desirably, to both surfaces of the two objects to be buffered. In view of the above, the composition of the shock absorbing material is defined as described below.

The polymeric viscous material in this invention constitutes a substrate of the shock absorbing material according to this invention, for which synthetic rubber such as styrene-butadiene rubber, butyl rubber, nitrile rubberand chloroprene rubber, natural rubber or a resin such as a diene type block polymer can be used individually or as a mixture of two or more of the same. The polymeric viscous material is desirably blended in an amount from 10 to 60 parts by weight, because the strength is insufficient if it is less than 10 parts by weight, while the heat softening nature is reduced to impair the workability upon molding and a disadvantage in view of the cost also results if it exceeds 60 parts by weight.

The softening agent is blended in an amount of from 10 to 50 parts by weight to the polymeric viscous material as described above. The softening agent is used for providing the polymeric viscous material with flexibility and adhesiveness, and well-known softening agents such as of vegetable oil, fatty oil, petroleum, coal tar and synthetic resin can be used individually or as a mixture of two or more of the same. The blending amount of the softening agent particularly affects the workability and it is blended, most desirably, within a range from 10 to 50 parts by weight.

The tackifier is blended in an amount of from 10 to 60 parts by weight together with the softening agent to the polymeric viscous material. The tackifier is used for providing the polymeric viscous material with adhesiveness, and well-known tackifier such as xylene resin, phenol resin, cumarone resin, hydrogenated rosin ester, terpene resin, polyisobutylene and polymeric wax can be used individuall or as a mixture of two or more of the same. It is desirable that the tackifier to be blended have a softening point, particularly, of from 80° to 130° C. If the tackifier used has a softening point lower than 80° C., the heat resistance is degraded and, while on the other hand, if it is higher than 130° C., the adhesiveness is undesirably decreased.

The softening agent and the tackifier are most desirably used each by the blending amount within the above-specified range. If each of the blending amounts is less than the above-specified range, the adhesiveness becomes poor and, while on the other hand, if it exceeds the above-mentioned range, the heat resistance and the strength are degraded and the workability upon molding is decreased.

In the shock absorbing material according to this invention, it is desirable to further mix elastomeric particles in addition to the polymeric viscous material, softening agent and tackifier described above. The elastomeric particles are used for increasing the elasticity modulus of the shock absorbing material thereby improving the buffering effect. WHile various materials such as wood powder and fibers may beused, the use of vulcanized powdered rubber is particularly desirable in view of the longlasting elasticity, hardness and the like. For instance, vulcanized powdered rubber such as of natural rubber, styrene-butadiene rubber, nitrile rubber and butyl rubber can be used individually or as a mixture of two or more of the same. The particle size of the powdered rubber desirably ranges from 0.1 to 3 mm. If the particle size is less than 0.1 mm, the buffering effect is insufficient and, while on the other hand, if it is larger than 3 mm, the workability upon molding is poor and the surface smoothness of the shock absorbing material obtained is degraded.

It is also preferable that the elastomeric particles be a hollow or porous material having inner space. In this case, the elasticity is increased mainly due to the presence of the inner space, and resin or the like can be used as well as the rubber. Such elastomeric particles can include, for example, microballoons, which may be of a hollow structure already at the time of kneading, or those materials that are foamed into the hollow structure by the heat upon application of the shock absorbing material may be used.

The elastomeric particles are desirably blended in an amount from 0 to 65 parts by weight. If it exceeds 65 parts by weight, the adhesiveness is reduced and the appearance is deteriorated as well.

A most preferred method of applying the shock absorbing material according to this invention having the foregoing composition will now be described hereinafter.

The method of applying the shock absorbing material according to this invention comprises a melting step of heating to melt at least one surface of a shock absorbing material comprising from 10 to 60 parts by weight of a polymeric viscous material, from 10 to 50 parts by weight of a softening agent, from 10 to 60 parts by weight of a tackifier and 0 to 65 parts by weight of elastomeric particles, and a disposing step of disposing the shock absorbing material melted at least at one surface thereof to at least one surface of two objects to be buffered.

The melting step is a step of heating a shock absorbing material to be melted to a temperature higher than the synthetic melting point thereof. The synthetic melting point means herein such a melting point of the entire shock absorbing material as provided by each of the ingredients in the shock absorbing material. The shock absorbing material may either be melted, for example, by partially melting only the surface thereof abutting against the object to be buffered or by melting the material entirelyinto a liquid state.

The disposing step is a step of disposing the shock absorbing material metled with at least one surface thereof to a predetermined position of the object to be buffered in a predetermined thickness and then fused to the object to be buffered. For instance, fusing can be effected by melting one surface of the shock absorbing material molded into a predetermined thickness and a predetermined shape and disposing the material by abutting the one surface to the predetermined position of the object to be buffered by the manual work of an operator. Alternatively, the shock absorbing material may be melted at both of the surface and the rearface thereof, disposed being placed between the two objects to be buffered and then fused together with the two objects.

The shock absorbing material according to this invention has a property of melting into a liquefied state when heated to a temperature higher than the synthetic melting point. Accordingly, it is preferable to supply the melted and liquefied shock absorbing material under pressure by means of a pump or the like and discharge the melt from a nozzle having a discharge port of a predetermined shape while taking advantage of this property. Automatic application of the shock absorbing material by the use of a machine is thus enabled.

The shape of the discharge port of the nozzle can optionally be designed into a circular, rectangular or any other shape considering the configuration of the shock absorbing material to be disposed. Further, the thickness of the shock absorbing material to be disposed can be adjusted by controlling the discharging amount and the displacing speed of the nozzle.

If the viscosity of the shock absorbing material discharged from the nozzle is too low, the shape of the shock absorbingmaterial may some time be lost till it is solidified. Accordingly, it is desirable to specify the heating temperature in the melting step such that the viscosity is higher than the predetermined value in view of the shape of the shock absorbing material and while it can be discharged from the nozzle. In this way, it is possible to dispose the shock absorbing material into a predetermined shape by displacing the nozzle for a certain distance while discharging the melted shock absorbing material and, thereafter, interrupting the discharge. The shock absorbing material may some time be displaced together with the nozzle due to its viscosity even after the interruption of the discharge. In order to prevent such a disadvantage, a heating means is preferably disposed at the top end of the discharge port of the nozzle. By actuating the heating means after the interruption of the discharge, the viscosity of the shock absorbing material at the top end of the discharge port is decreased, by which the separation between the disposed shock absorbing material and the nozzle can be facilitated.

While the shock absorbing material can be disposed manually by an operator using the nozzle as described above, use of a robot or the like is preferred. This can save the man power and improve the positioning accuracy upon disposing the shock absorbing material.

As described above specifically, the shock absorbing material according to this invention can be melted under heating and fused to an object to be buffered. Therefore, since the use of the adhesive or bond is no longer necessary, aging degradation in the bonding strength of the adhesive experienced is not observed, stable bonding strength can be maintained and problems such as detaching of the shock absorbing material, due to vibrations, etc. can be prevented.

Further, since the shock absorbing material according to this invention hardly absorbs any water, the corrosion resistance can significantly be improved as compared with the conventional case.

Further, the blended elastomeric particles enhance the shock absorbing effect and thereby contribute to the maintenance of a stable bonding strength.

Furthermore, since the shock absorbing material according to this invention can substantially be liquified upon fusing and formed well, aligning with the unevenness on the surface of the object to be buffered, the bonding strength can further be improved and, in addition, the number of steps can be decreased as compared with the conventional case.

Moreover, by carrying out the disposing step by discharging the liquefied shock absorbing material from the nozzle, application of the shock absorbing material can be automated by using a robot or the like. Since the positioning accuracy can thus be improved, the shock absorbing effect can surely be attained and the required amount of the shock absorbing material can be minimized. This also provides an economical advantage. Further, the thickness of the shock absorbing material can conveniently be adjusted optionally by varying the discharge amount, the shape of the discharge port of the nozzle, the displacing speed of the nozzle and the like.

BRIEF DESCRIPTION OF THE DRAWINGS

FIGS. 3, 4 and 5 show, respectively, specimens used in the testing of examples, in which FIG. 3 is a perspective view of a test specimen used for the adhesion test, FIG. 4 is a perspective view showing the step at the midway of preparing the test specimen shown in FIG. 3 and FIG. 5 is a perspective view including a partial cross section of a test specimen used in the corrosion test.

BEST MODE FOR CARRYING OUT THE INVENTION

Figure 1:
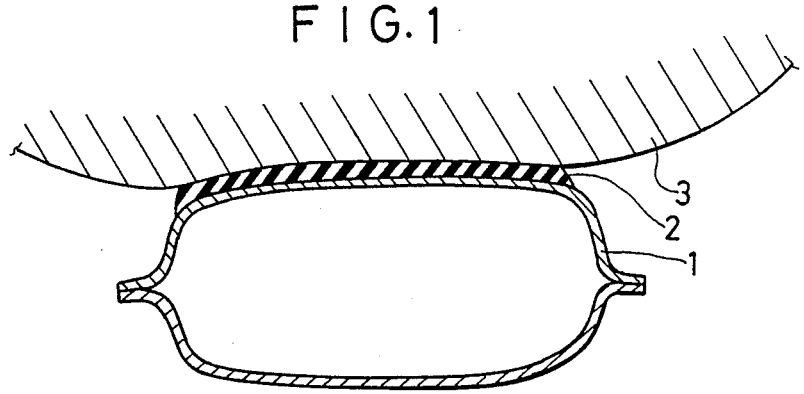
FIG. 1 is a cross sectional view showing a fuel tank mounted to a vehicle body by using a shock absorbing material according to this invention.
Figure 2:
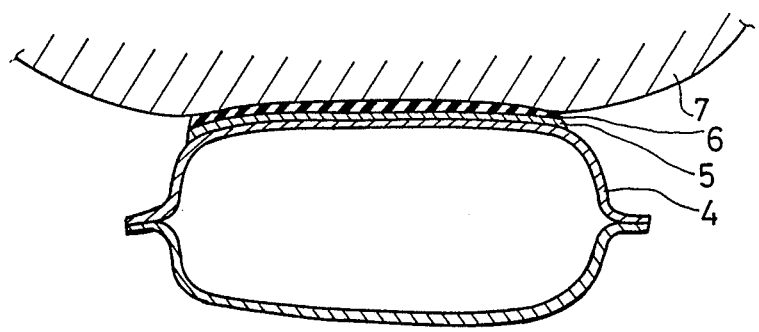
FIG. 2 is a cross sectional view showing a fuel tank mounted to a vehicle body by using a conventional shock absorbing material.

This invention will now be be described specifically referring to examples.

(1) PREPARATION OF COMPOSITION SHOCK ABSORBING MATERIAL

EXAMPLE 1

15 parts by weight of butyl rubber (Butyl 268, manufactured by Nihon Butyl Co.) and 10 parts by weight of ethylene-vinyl acetate copolymer (EVA 1830, manufactured by Nihon Unika Co.) as the polymeric viscous material, 25 parts by weight of polybutene (HV-300, manufactured by Nippon Petrochemical Co.) as the softening agent and 40 parts by weight of powdered rubber composed of vulcanized natural rubber (0.5 mm average particle size) as the elastomeric particles were charged in a pressurized type kneader and kneaded at a temperature from 100° C. to 120° C. for 20 to 30 minutes. Further, 15 parts by weight of cumarone resin (NT-2, manufactured by Nittetsu Kagaku Co.) as the tackifier were charged in the composition as described above and kneaded for 10 minutes to thereby obtain a uniform composition for shock absorbing material.

EXAMPLE 2

30 parts by weight of butyl rubber (Butyl 268, manufactured by Nippon Butyl Co.) and 20 parts by weight of styrene-butadiene rubber (Kaliflex 1102, manufactured by Shell Chemical Co.) as the polymeric viscous material, 25 parts by weight of polybutene (HV-300, manufactured by Nippon Petrochemical Co.) as the softening agent and 10 parts by weight of powdered rubber composed of vulcanized butyl rubber (3 mm average particle size) as the elastomeric particles were kneaded in the same manner as in Example 1, to which were further charged 15 parts by weight of terpene resin (YS resin P#1150, manufactured by Yasuhara Yushi Co.) as the tackifier and they were kneaded for 10 minutes to thereby obtain a uniform composition for shock absorbing material of Example 2.

EXAMPLE 3

The same materials were used in the same amounts as those in Example 1 except for using 35 parts by weight of powdered rubber composed of vulcanized natural rubber (not more than 0.1 mm average particle size) as the elastomeric particles and they were kneaded in the same manner to obtain a composition for shock absorbing material of Example 3.

EXAMPLE 4

The same materials were used in the same amounts as those in Example 1 except for using 15 parts by weight of alkylphenol resin (SP-1050, manufactured by Dainippon Ink Chemical Industry Co.) as the tackifier, and they were kneaded in the same manner to obtain a composition for shock absorbing material of Example 4.

(2) TEST EXAMPLE

Shock absorbing materials were formed respectively from the compositions of the above-mentioned examples and tested for the bonding strength, bonding strenth after the water-proof test, impact shock test and corrosion resistance, the results of which are shown in the table. The same tests were also carried out for Comparative Example 1 in which a chloroprene rubber adhesive was used and Comparative Example 2 in which a butyl rubber adhesive was used by using conventional shaping product of shock absorbing material composed of vulcanized natural rubber (hardness 69) and the results are shown in the table.

Figure 3:
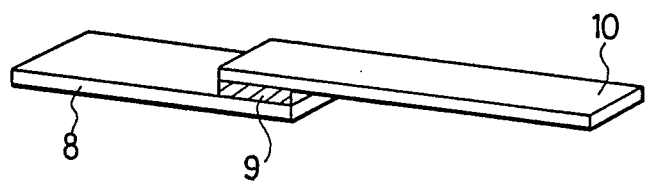
Figure 4:
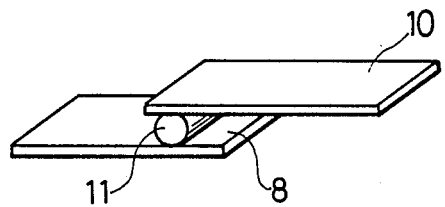

As shown in FIG. 3, a specimen 9 was put as a test piece between a steel test plate 8 of 25 mm×100 mm×0.8 mm and an electrocoating plate 10 of the same shape as the steel plate and previously coated with an electrodepositing paint, for the test of the bonding strength and the bonding strength after the water-proof test. The composition in each of the examples was melted at 140°–170° C. by using a Bulkmelter (manufatured by Nodoson Co.), and discharged as a composition 11 from the nozzle of 10 mm pore diameter onto the steel plate 8 as shown in FIG. 4. Then, 2 minutes after the electrocating plate 10 was placed thereover, they were left for 24 hours being pinched in a clip and pressed to settle into a shock absorbing material. In the comparative example, an adhesive or bond was coated onto a steel plate 8 into a dry thickness of from 30 to 50 microns, a shock absorbing material was placed thereover 2 minutes after and an electrcoating plate 10 was further placed thereover, which were pinched by a clip, left for 24 hours and then pressed to settle.

For the respective test pieces as described above, the bonding strength was measured by pulling the steel plate 8 and the electrocoating plate 10 to the opposite directions respectively each at a rate of 200 mm/min to determine the shearing elasticity modulus. Further, the bonding strength after the water-proof test was measured by using the same test specimen as used for the determination of the bonding strength described above, to determine the shearing elasticity modulus after immersing in warm water at 40° C. for 7 days (168 hours).

The impact shock test was carried out in the manner described below. The composition of the shock absorbing material of the examples were melted to fuse to the central portion of a steel test plate of 300×100×0.8 mm at a temperature from 140° C. to 170° C. by a Bulkmelter, and discharged so as to be in 50 mm diameter and 10 mm thickness to form a shock absorbing material and then left for 24 hours. The shock absorbing material of the Comparative Example was tested by the procedures of caoting an adhesive or bond to the similar steel plate into a dry thickness of 30 to 50 microns, placing thereover a shock absorbing material of the same shape as above, leaving them for 24 hours while pinching by a clip, and applying an impact shock with an angle of 90 degree by using a shock tester employed in JIS-K6830-26 to examine the peeling of the specimen.

Figure 5:
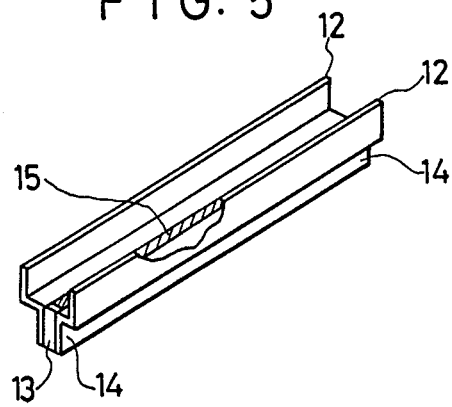

For the corrosion resistance, two sheets of cold rolling steel plates 12 each 300 mm length and 0.8 mm thickness and of the shape as shown in FIG. 5 were used and spacers 13 of 5 mm thickness were put at both ends. Then, the shock absorbing material 15 was formed in a portion surrounded with the spacers 13 and the two sheets of steel plate 12 in the same manner as in the test for the bonding strength. Then, both ends were fixed with bolts 14 to prepare a test specimen. The respective test specimens were served to the salt water spray test of spraying salt water at 5% concnetration for 300 hours at 35° C. according to JIS-Z2371. Thereafter, the botls 14 were detached and the shock absorbing material was peeled off and the degree of corrosion was examined after cleaning the surface.

The shock absorbing material prepared from the composition for the shock absorbing material in the examples was measured for the specific gravity, hardness, water absorption rate, compression ratio and the recovery ratio respectively. The hardness was measured according to the spring type hardness test in JIS-K6301, and the water absorption rate was measured as the weight increasing rate when the shock absorbing material was immersed in water for 168 hours. The compression ratio was the ratio of the volume of the shock absorbing material after supplying a load of 15 kg/cm² relative to the initial volume thereof. The recovery ratio was the ratio of the volume after removing the load relative to the initial volume. Accordingly, a greater difference between the compression ratio and the recovery ratio means a higher elasticity modulus.

(3) EVALUATION OF THE TEST

From the results shown in the table, the shock absorbing material formed from the composition for the shock absorbing material in the examples of this invention exhibited that no substantial reduction in the bonding strength after the water-proof test as compared with that of the conventional shock absorbing material of the comparative examples and that the bonding strength was stable even after the passage of time. Further, the shock absorbing material of the comparative examples was peeled off earlier also in the impact shock test. Furthermore, in the corrosion resistance, the shock absorbing material according to this invention exhibited significantly excellent performance as having the rust generation ratio of about 1/10 of the conparative examples.

TABLE

|  | Example | | | | Comparative Example | |
| --- | --- | --- | --- | --- | --- | --- |
|  | 1 | 2 | 3 | 4 | 1 | 2 |
| Specific gravity | 1.04 | 1.03 | 1.04 | 1.04 | 1.08 | 1.11 |
| Hardness | 96 | 87 | 96 | 95 | — | — |
| Water absorption ratio (%) | 0.20 | 0.19 | 0.20 | 0.20 | 0.36 | 0.35 |
| Compression ratio (%) | 24 | 36 | 23 | 27 | 25 | 25 |
| Recovery ratio(%) | 84 | 76 | 83 | 85 | 85 | 85 |
| Bonding strength |  |  |  |  |  |  |
| initial | 3.5 | 3.2 | 3.7 | 4.2 | 1.5 | 2.9 |
| after waterproof test | 3.4 | 3.0 | 3.5 | 4.2 | 0.9 | 1.7 |
| Impact shock test (number of cycles till peeling off) | 10 | 7 | 10 | 15 | 7 | 5 |
| Corrosion resistance (rust generation rate) (%) | 5 | 7 | 5 | 2 | 50 | 20 |

Further, the shock absorbing material formed from the composition in Example 2 had a reduced difference between the compression ratio and the recovery ratio as comapred with that in other examples and the value of the impact shock test was similar to that in Comparative Example 1. However, it was excellent as compared to the Comparative Example with respect to the bonding strength after the water-proof test and the corrosion resistance.

(4) APPLICATION EXAMPLE

Figure 6:
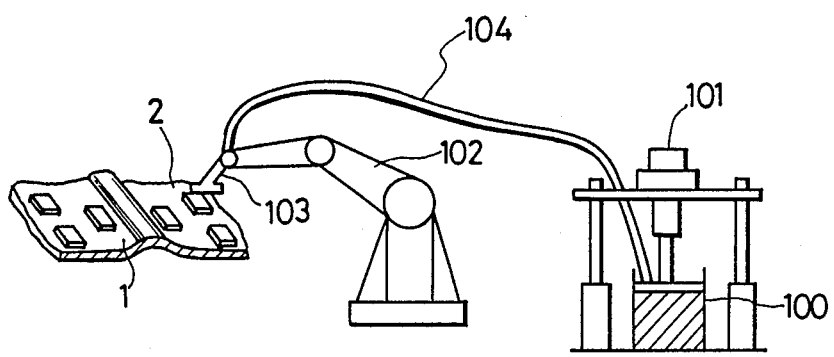
FIG. 6 is an explanatory view illustrating one embodiment of a method of applying the shock absorbing material according to this invention.

The shock absorbing material was applied when mounting a fuel tank for use in vehicle to a vehicle body by the device shown in FIG. 6 while using the composition for the shock absorbing material prepared in Example 1.

The device comprises a Bulkmelter 101 (model 500 manufactured by Nodoson Co.), a robot 102, a nozzle 103 held at an operation arm of the robot 102 and a heat pipe 104 for carrying molten composition for the shock absorbing material from the Bulkmelter 101 to the nozzle 103.

At first, the composition 100 for the shock absorbing material placed in a container was heated to 160° C. on a platen (heating plate) of a Bulkmelter 101 and melted. The melted composition for the shock absorbing material was supplied under pressure 70 kg/mm by an incorporated pump and then discharged through a heat pipe 104 heated to 160° C. from the nozzle 103 to the surface of a fuel tank 200.

The discharge port of the nozzle 103 is of a rectangular shape in 5 mm×50 mm size and it was adapted such that the discharge amount could optionally be controlled within a range of from 100 to 500 g/min. Further, the robot 102 was previously subjected to teachign such that is displaced the nozzle 103 by 100 mm at a predetermined position on the surface of the fuel tank 1 while discharging the composition of the shock absorbing material along the surface thereof, then stops the discharge and leaves the surface of the fuel tank 1 after once urging the nozzle 103 thereto.

As described above, the composition for the shock absorbing material discharged to a plurality of predetermined positions on the surface of the fuel tank 1 is cooled to solidify into a shock absorbing material 2. Then, by mounting the fuel tank 1 disposed with the shock absorbing material 2 to a vehicle body by using a metal belt not illustrated, application of the shock absorbing material is completed. FIG. 1 shows the state where the fuel tank 1 is mounted to the vehicle body 3 by way of the shock absorbing material 2 according to this invention. By mounting the shock absorbing material 2 to the vehicle body 3 while it has not yet been completely cured and thus still has an adhesiveness on the surface, the shock absorbing material 2 is fused also to the vehicle body 3 to further improve the mounting strength and the corrosion resistance.

What is claimed is:

1. A thermoplastic shock absorbing material placed between two objects for buffering impact shocks, wherein the shock absorbing material is joined to at least one surface of the two objects by fusion thereto, and which consists essentially of:
    (a) from about 10-60 parts by weight of one or more uncured viscous polymeric materials selected from the group consisting of styrene-butadiene rubber, butyl rubber, nitrile rubber, chloroprene rubber, natural rubber, and a diene block polymer;
    (b) from about 10-50 parts by weight of one or more softening agents selected from the group consisting of vegetable oil, fatty oil, petroleum oil, coal tar and synthetic resins; and (c) from about 10–60 parts by weight of one or more tackifiers selected from the group consisting of xylene resin, phenol resin, cumarone resin, hydrogenated rosin ester, terpene resin, polyisobutylene and polymeric was.

2. A shock absorbing material as claimed in claim 1, wherein said shock absorbing material is placed between the surface of a vehicle body and the surface of a fuel tank.

3. The shock absorbing material as claimed in claim 1, which further comprises up to about 65 parts by weight of cured elastomeric particles, thereby increasing the elasticity modulus of the shock absorbing material.

4. The shock absorbing material as claimed in claim 3, wherein said elastomeric particles are particles of a vulcanized powdered rubber selected from the group consisting of natural rubber, nitrile rubber, butyl rubber and styrene-butadiene rubber.

5. The shock absorbing material as claimed in claim 3, wherein said elastomeric particles are powdered vulcanized rubber of from 0.1 to 3 mm particle size.

6. The shock absorbing material as claimed in claim 1, wherein said elastomeric particles have a hollow or porous structure having inner space.

7. The shock absorbing material as claimed in claim 3, wherein said tackifier has a softening point from 80° to 130° C.

* * * * *